United States Patent
Suzuki

(10) Patent No.: US 10,942,669 B2
(45) Date of Patent: Mar. 9, 2021

(54) INFORMATION PROCESSING APPARATUS AND COMPUTER-READABLE RECORDING MEDIUM

(71) Applicant: FUJITSU CLIENT COMPUTING LIMITED, Kanagawa (JP)

(72) Inventor: Takayoshi Suzuki, Kawasaki (JP)

(73) Assignee: FUJITSU CLIENT COMPUTING LIMITED, Kanagawa (JP)

( * ) Notice: Subject to any disclaimer, the term of this patent is extended or adjusted under 35 U.S.C. 154(b) by 0 days.

(21) Appl. No.: 16/439,296

(22) Filed: Jun. 12, 2019

(65) Prior Publication Data

US 2019/0294360 A1 Sep. 26, 2019

Related U.S. Application Data

(63) Continuation of application No. PCT/JP2017/047389, filed on Dec. 28, 2017.

(30) Foreign Application Priority Data

Jan. 17, 2017 (JP) .............................. JP2017-006045

(51) Int. Cl.
 *G06F 3/06* (2006.01)
 *G06F 11/30* (2006.01)

(52) U.S. Cl.
 CPC .......... *G06F 3/0653* (2013.01); *G06F 3/0604* (2013.01); *G06F 3/0631* (2013.01);
 (Continued)

(58) Field of Classification Search
 None
 See application file for complete search history.

(56) References Cited

U.S. PATENT DOCUMENTS

| 4,748,561 | A | * | 5/1988 | Brown | .................. | G06F 21/123 |
| | | | | | | 711/164 |
| 5,263,152 | A | * | 11/1993 | Smith | .................. | G06F 11/006 |
| | | | | | | 714/5.11 |

(Continued)

FOREIGN PATENT DOCUMENTS

| JP | H05-108534 A | 4/1993 |
| JP | 2000-322333 A | 11/2000 |

(Continued)

OTHER PUBLICATIONS

International Search Report issued in corresponding International Application No. PCT/JP2017/047389 dated Feb. 27, 2018, with translation (5 pages).

*Primary Examiner* — Kaushikkumar M Patel

(74) *Attorney, Agent, or Firm* — Osha Bergman Watanabe & Burton LLP

(57) ABSTRACT

An information processing apparatus includes: a processor that: compares first and second identification information, wherein the first identification information identifies a storage medium in which apparatus information about the information processing apparatus is saved, the apparatus information is memorized in a main board of the information (Continued)

processing apparatus, and the second identification information identifies a storage medium connected to the information processing apparatus; detects that a save destination of the apparatus information is replaced when the first and second identification information do not coincide with each other; and determines a state of the save destination of the apparatus information in accordance with a storage state of the apparatus information in the connected storage medium and a storage state of the apparatus information in the main board of the information processing apparatus when the first and second identification information coincide with each other.

5 Claims, 7 Drawing Sheets

(52) U.S. Cl.
CPC ............ *G06F 3/0674* (2013.01); *G06F 11/30* (2013.01); *G06F 11/3034* (2013.01)

(56) References Cited

U.S. PATENT DOCUMENTS

| | | | |
|---|---|---|---|
| 6,301,612 B1 * | 10/2001 | Selitrennikoff | G06F 9/4416 709/220 |
| 7,428,587 B2 * | 9/2008 | Rowland | H04L 29/12254 709/224 |
| 2003/0084316 A1 * | 5/2003 | Schwartz | G06F 21/575 726/34 |
| 2006/0034131 A1 | 2/2006 | Ono et al. | |
| 2007/0130434 A1 * | 6/2007 | Chu | G06F 21/80 711/163 |
| 2009/0037720 A1 * | 2/2009 | Cho | G06F 21/575 713/2 |
| 2009/0212813 A1 * | 8/2009 | Hu | G06F 21/73 326/8 |

FOREIGN PATENT DOCUMENTS

| | | |
|---|---|---|
| JP | 2001-282743 A | 10/2001 |
| JP | 2006-053703 A | 2/2006 |
| JP | 2011-194846 A | 10/2011 |

* cited by examiner

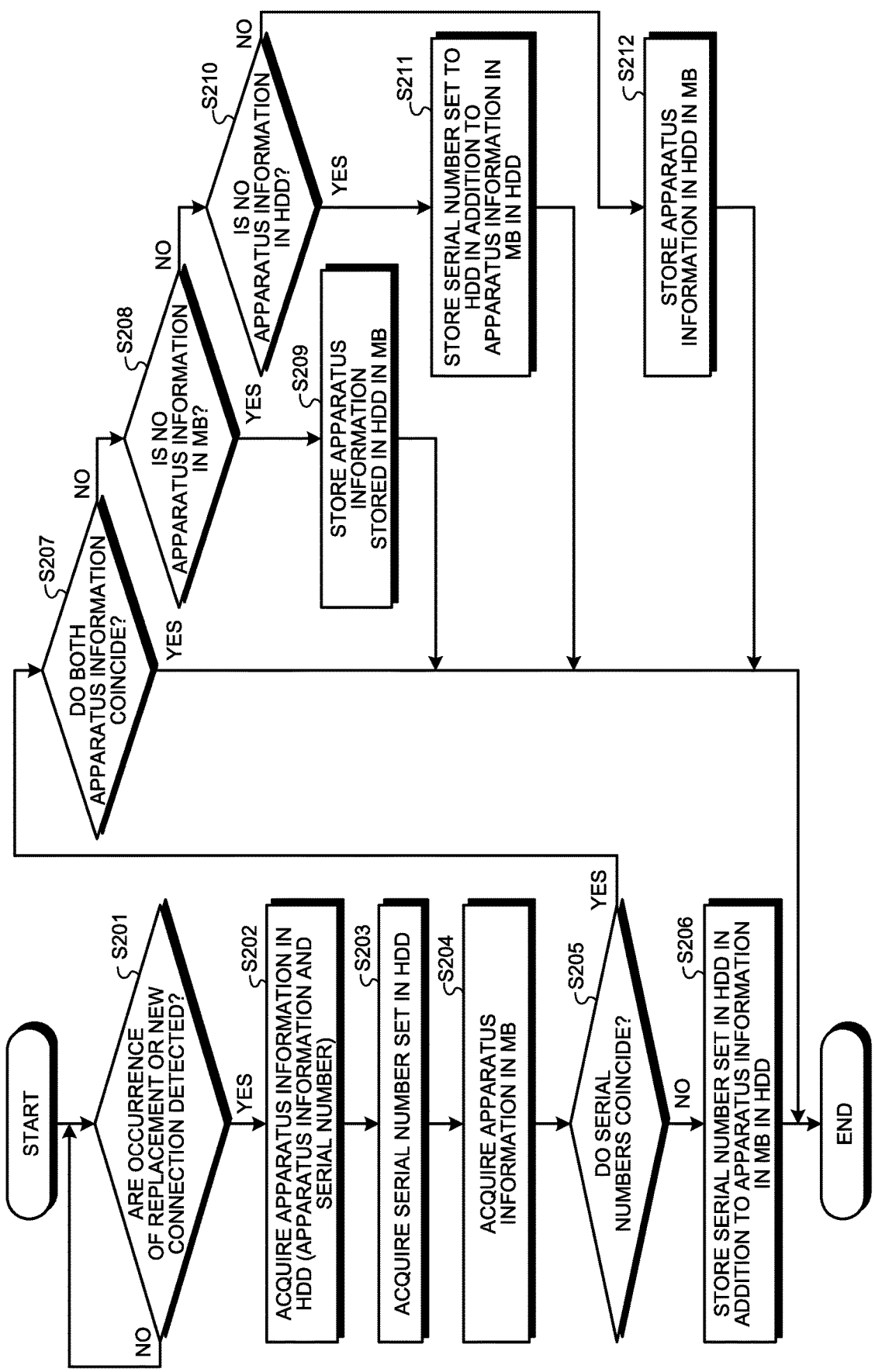

INFORMATION PROCESSING APPARATUS AND COMPUTER-READABLE RECORDING MEDIUM

CROSS-REFERENCE TO RELATED APPLICATIONS

This application is a continuation of PCT International Application No. PCT/JP2017/047389 filed on Dec. 28, 2017 which claims the benefit of priority from Japanese Patent Application No. 2017-006045 filed on Jan. 17, 2017, the entire contents of which are incorporated herein by reference.

FIELD

Embodiments described herein relate generally to an information processing apparatus and a computer-readable recording medium.

BACKGROUND

Companies have introduced asset management systems to manage their assets such as computers their employees use, for example. An example of such computers is attached with a label on which apparatus information such as its model name and its serial number is described, and stores the apparatus information in a basic input output system (BIOS)-read only memory (ROM) on its main board (motherboard). The asset management is performed by an asset management program that reads the apparatus information from the BIOS-ROM.

When the apparatus information in the computer is changed before and after maintenance is performed, correctness of the asset management is reduced. To cope with this, techniques have been known that automatically rewrite the apparatus information by maintenance programs before and after maintenance is performed. In an example of such techniques, when the main board is replaced, the maintenance program reads the apparatus information from the BIOS-ROM of the main board before being replaced in a state where the main board before being replaced operates, and automatically writes the read apparatus information into the replaced main board. In a state where the main board before being replaced does not operate, a maintenance worker checks the apparatus information from the label of the main board before being replaced and then manually writes the checked apparatus information into the replaced main board using the maintenance program.

Recently, another technique has been known that prevents unnecessary rewrite of the apparatus information by saving the apparatus information in a save region such as a built-in hard disk drive (HDD) or an external HDD other than the BIOS-ROM of the main board.

Examples of conventional techniques are Japanese Patent Application Laid-open No. H05-108534 and Japanese Patent Application Laid-open No. 2001-282743.

When discrepancy occurs between information stored in a storage region of the BIOS-ROM and information stored in a storage medium, the technique described above, however, cannot identify whether the main board is replaced or the storage medium is replaced.

Some companies may prepare an HDD that serves as an original master used as a basis of a certain apparatus, and use the HDD copied from the original master HDD for another apparatus in some cases, for example. In such a case, the apparatus information about the apparatus the original master of which is made is expanded to other apparatuses via the copied HDD. When repair and maintenance are performed plurality of times, the save region in which the apparatus information is saved may be wrongly used for other apparatuses or the apparatus information about the original apparatus may be written into other apparatuses. In such a case, correct apparatus information cannot be managed in the computer when maintenance and replacement are performed.

SUMMARY

According to an aspect, an information processing apparatus, includes: a processor that performs: comparing first identification information with second identification information, the first identification information identifying a storage medium in which apparatus information about the information processing apparatus is saved, the apparatus information being memorized in a main board of the information processing apparatus, the second identification information identifying a storage medium connected to the information processing apparatus; detecting that a save destination of the apparatus information is replaced when the first identification information and the second identification information do not coincide with each other; and determining a state of the save destination of the apparatus information in accordance with a storage state of the apparatus information in the connected storage medium and a storage state of the apparatus information in the main board of the information processing apparatus when the first identification information and the second identification information coincide with each other.

According to an aspect, a replaced component can be identified.

BRIEF DESCRIPTION OF THE DRAWINGS

FIG. 7 is a flowchart illustrating a processing flow at management.

DETAILED DESCRIPTION

The following describes embodiments of an information processing apparatus and a management program in detail with reference to the accompanying drawings. The following embodiments do not limit the invention.

First Embodiment

Asset Management

An information processing apparatus 1 according to a first embodiment is a typical computer such as a server, a personal computer, a notebook computer, or a tablet terminal. In the information processing apparatus 1, an asset management program is activated. Using the asset management program, apparatus information such as its model name and its manufacturing number of the information processing apparatus 1 is collected to perform asset management. In addition, maintenance management is performed in the information processing apparatus 1 such that pieces of the apparatus information about other information processing apparatuses are not mixed with the apparatus information about the information processing apparatus 1.

Hardware Structure

Figure 1:
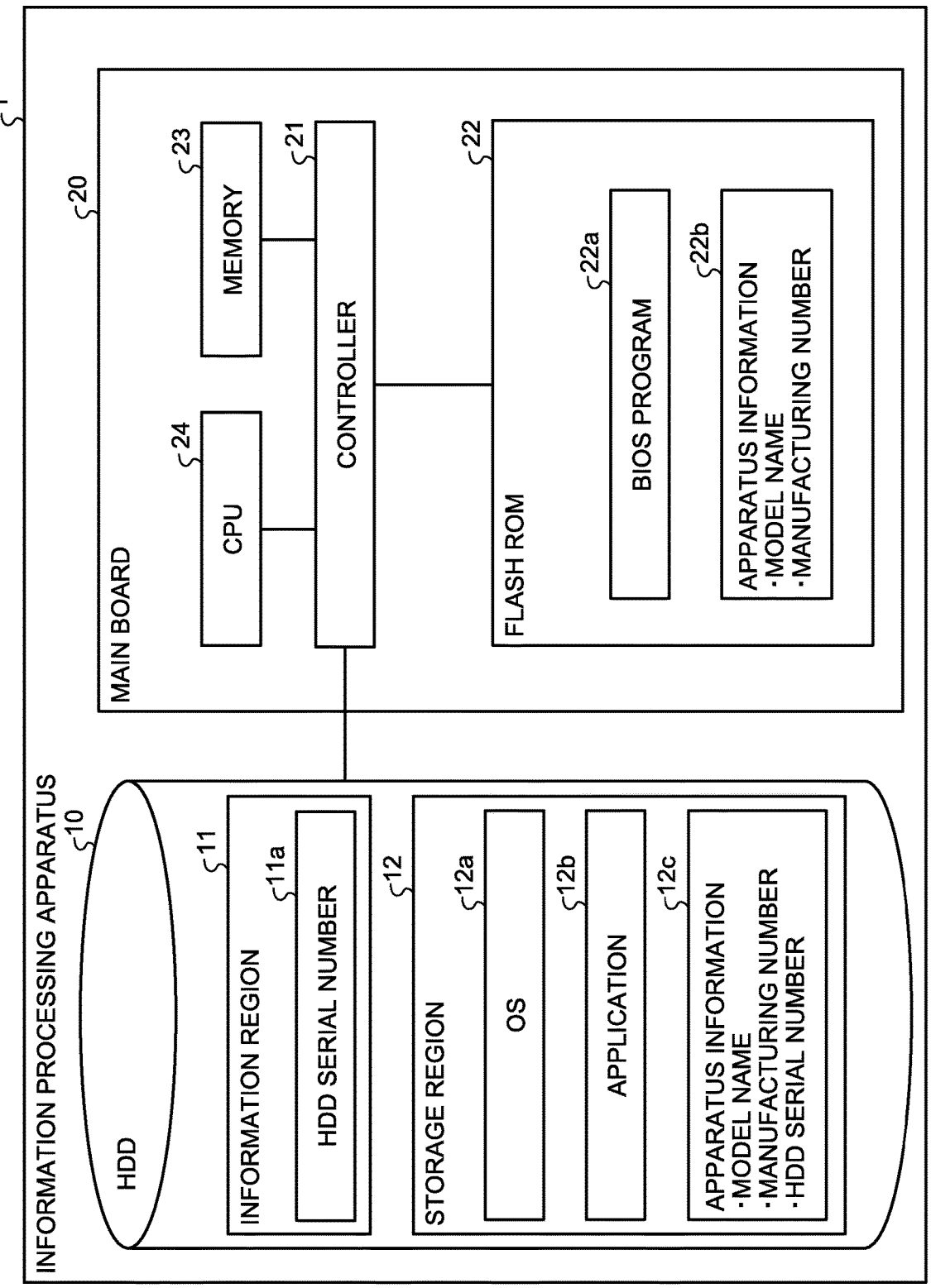
FIG. 1 is a diagram illustrating an exemplary hardware structure of an information processing apparatus according to a first embodiment.

FIG. 1 is a diagram illustrating an exemplary hardware structure of the information processing apparatus according to the first embodiment. As illustrated in FIG. 1, the information processing apparatus 1 includes an HDD 10 and a main board (hereinafter described as the MB in some cases) 20. The HDD 10 and the main board 20 are connected with an existing bus such as a peripheral component interconnect (PCI) bus. In this example, the HDD 10 is included in the information processing apparatus 1. The HDD 10 is not limited to being included in the information processing apparatus 1. The HDD 10 may be externally provided and used. In this case, processing can also be performed in the same manner as the HDD 10 included in the information processing apparatus 1.

The HDD 10 includes an information region 11 and a storage region 12. The information region 11 memorizes information set to the HDD 10 and is an un-rewritable region. The information region 11 memorizes a serial number 11a of the HDD 10, for example. The serial number 11a is stored in the information region 11 at factory shipment and uniquely identifies the HDD 10.

The storage region 12 memorizes information stored by other apparatuses connected to the HDD 10 and is a rewritable region. Specifically, the storage region 12 memorizes various programs such as an operating system (OS) 12a and an application 12b, and apparatus information 12c. The apparatus information 12c is identification information that is about the information processing apparatus connected to the HDD 10 and saved by the information processing apparatus. The apparatus information 12c includes the saved model number and manufacturing number of the information processing apparatus, and a serial number of the HDD the information processing apparatus recognizes as the save destination, for example.

For example, when an information processing apparatus A is connected to an HDD 10-1, the information processing apparatus A stores apparatus information A about the information processing apparatus A and a serial number (SS1) of the HDD 10-1 in the storage region 12 of the HDD 10-1. When an HDD 10-2 is, then, newly connected to the information processing apparatus A, the information processing apparatus A stores the apparatus information A about the information processing apparatus A and a serial number (SS2) of the HDD 10-2 in the storage region 12 of the HDD 10-2. In this way, the information processing apparatus saves the own apparatus information in the HDD.

The HDD 10-1 memorizes the apparatus information A about the information processing apparatus A, which is stored in the information processing apparatus A, and the own serial number (SS1) in the storage region 12. When the HDD 10-1 is connected to information processing apparatus C after being connected to the information processing apparatus A, the HDD 10-1 memorizes apparatus information C about the information processing apparatus C, which is stored in the information processing apparatus C, and the own serial number (SS1) in the storage region 12. In this way, the HDD functions as the save destination of the apparatus information about the information processing apparatus connected to the HDD.

The main board 20, which is an example of the motherboard, includes a controller 21, a flash read only memory (ROM) 22, a memory 23, and a central processing unit (CPU) 24.

The controller 21 is a device connected to each of the units such as the HDD 10, the flash ROM 22, the memory 23, and the CPU 24. The controller 21 controls data communication with each unit.

The flash ROM 22, which is an example of a storage device that allows data to be freely read therefrom and written thereinto, is called a BIOS-ROM, for example. The flash ROM 22 memorizes a BIOS program 22a and apparatus information 22b.

The BIOS program 22a, which is used for executing the BIOS, executes writing of data into the flash ROM 22 and reading data from the flash ROM 22. The BIOS program 22a executes writing data into the storage region 12 of the HDD 10 and reading data from the storage region 12 of the HDD 10. The apparatus information 22b, which is the apparatus information about the information processing apparatus 1, is the model name and the manufacturing number of the information processing apparatus 1, for example.

The memory 23 is an example of a storage device that memorizes various types of information. Various programs are developed on the memory 23 to execute various processes.

The CPU 24, which is an example of a processor, is a processing unit that manages the processing of the whole of the information processing apparatus 1. Specifically, the CPU 24 reads the programs such as the OS 12a and the application 12b from the HDD 10 and develops them on the memory 23 to execute the various types of processing.

For example, the CPU 24 executes the saving of the apparatus information about the information processing apparatus 1, the detection of replacement of the HDD, and the detection of replacement of the main board 20. The following specifically describes the processing performed by the CPU 24 on the basis of the processing at initial activation and the processing at management of respective replacements as examples. Functional units that execute the various types of processing described below may also be included in the CPU 24.

At Initial Activation

When detecting the connection with the HDD 10 at initial activation of the information processing apparatus 1, the CPU reads the serial number 11a of the HDD 10 from the information region 11 of the HDD 10 and holds the serial number in the main board 20. The CPU 24, then, reads the apparatus information 22b from the flash ROM 22 of the main board 20. Thereafter, the CPU 24 stores the apparatus information 22b and the serial number 11a of the HDD 10 in the storage region 12 of the HDD 10. In this way, the information processing apparatus 1 saves the apparatus information 22b about the information processing apparatus 1 in the HDD 10.

At Management

When detecting that the main board 20 is connected to a new HDD, or, at predetermined intervals, the CPU 24 reads the serial number of the HDD currently connected to the main board 20 from the information region of the HDD, and the apparatus information memorized in the storage region of the HDD. When the HDD serial number acquired from the information region and the HDD serial number included in the apparatus information differ from each other, or no serial number is included in the apparatus information, the CPU 24 detects that the HDD having been connected is replaced. In this case, the CPU 24 saves the apparatus information in the main board 20 in the currently connected HDD in the same manner as that at the initial activation.

The CPU 24 can detect that the HDD having been connected is replaced without comparison the serial numbers in the HDD with each other. For example, the CPU 24 holds the serial number of the HDD in which the apparatus information is saved and compares the held serial number with the serial number memorized in the information region of the newly connected HDD. When the serial numbers do not coincide with each other, the CPU 24 detects that the HDD having been connected is replaced.

When the HDD serial number acquired from the information region of the HDD and the HDD serial number included in the apparatus information memorized in the HDD coincide with each other, the CPU 24 determines a state of the save destination of the apparatus information in accordance with a storage state of the apparatus information in each of the storage region of the connected HDD and in the flash ROM 22 of the main board 20.

More specifically, when the apparatus information memorized in the HDD and the apparatus information 22b memorized in the main board 20 differ from each other, the CPU 24 determines that the apparatus information is wrongly written in the replacement of the main board 20. When the apparatus information 22b is not memorized in the main board 20, the CPU 24 determines that no apparatus information is written in the replacement of the main board 20. In those cases, the CPU 24 stores the apparatus information memorized in the HDD in the flash ROM 22 of the main board 20. The CPU 24 may read the serial number of the HDD from which the apparatus information is read from the information region of the HDD and store the serial number in the main board 20.

When the apparatus information memorized in the HDD and the apparatus information 22b memorized in the main board 20 coincide with each other, the CPU 24 determines that the save destination of the apparatus information is not changed. When the apparatus information 22b is not memorized in the HDD, the CPU 24 determines that the HDD serving as the save destination of the apparatus information is replaced. In this case, the CPU 24 executes the processing in the same manner as that at the initial activation. The CPU 24 stores, in the storage region of the HDD, the apparatus information 22b memorized in the flash ROM 22 of the main board and the serial number of the currently connected HDD.

SPECIFIC EXAMPLES

The following describes specific examples of the respective determinations described above with reference to FIGS. 2 to 5. The processing when the HDD 10 is replaced and the processing when the main board 20 is replaced are described.

First Management Example of HDD

Figure 2:
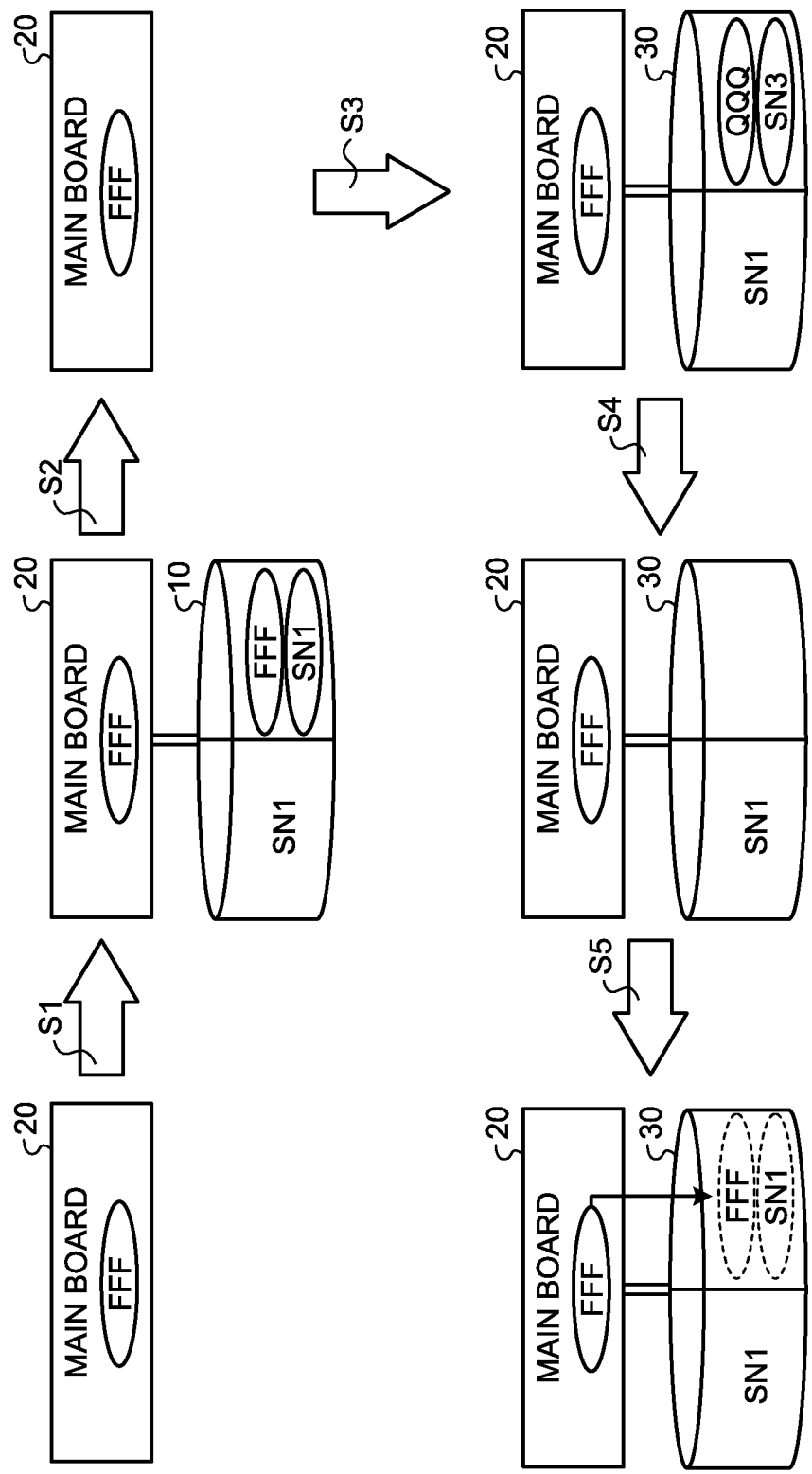
FIG. 2 is a diagram explaining a first management example when an HDD is replaced.

FIG. 2 is a diagram explaining a first management example when the HDD 10 is replaced. As illustrated in FIG. 2, when the HDD 10 to which a serial number "SN1" is set is connected while the main board 20 holds apparatus information "FFF", the CPU 24 writes, into the storage region of the HDD 10, the apparatus information "FFF" held by the main board 20 and the serial number "SN1" (S1).

Thereafter, the HDD 10 is removed from the main board 20 (S2), and an HDD 30 to which a serial number "SN3" is set is connected. The CPU 24 determines that the HDD is replaced because the serial number "SN1" set in the information region of the HDD 30 and the serial number "SN3" memorized in the storage region of the HDD 30 do not coincide with each other (S3). When the serial numbers in the HDD 30 coincide with each other but the serial number held as the save destination information at S1 differs from the serial number in the HDD 30, the CPU 24 can also determine that the HDD having been connected is replaced.

The CPU 24 deletes the apparatus information "QQQ" and the serial number "SN3" that are memorized in the storage region of the HDD 30 (S4). Thereafter, the CPU 24 writes, into the storage region of the HDD 10, the apparatus information "FFF" held by the main board 20 and the serial number "SN1" (S5).

Second Management Example of HDD

Figure 3:
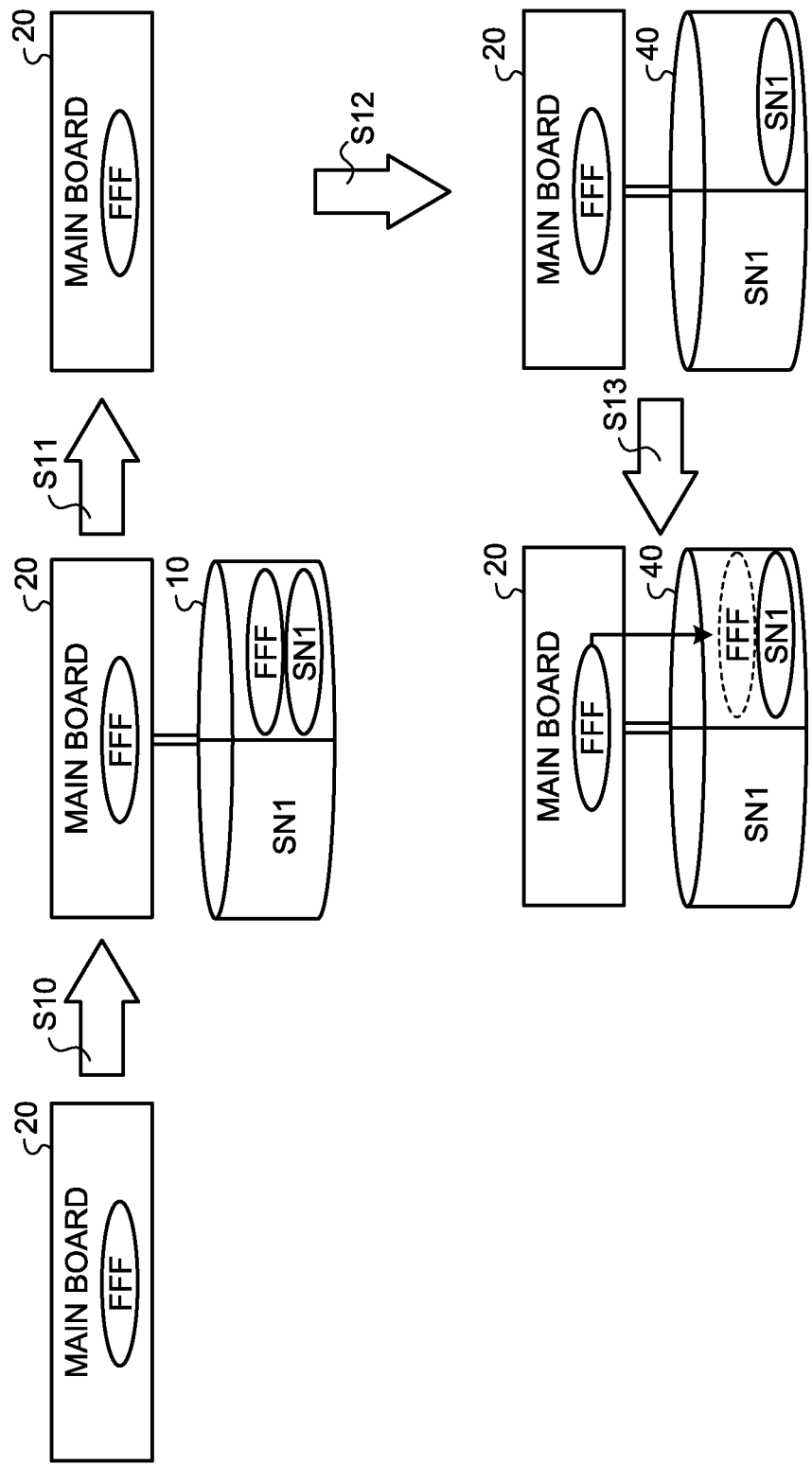
FIG. 3 is a diagram explaining a second management example when the HDD is replaced.

FIG. 3 is a diagram explaining a second management example when the HDD 10 is replaced. As illustrated in FIG. 3, when the HDD 10 to which the serial number "SN1" is set is connected while the main board 20 holds the apparatus information "FFF", the CPU 24 writes, into the storage region of the HDD 10, the apparatus information "FFF" held by the main board 20 and the serial number "SN1" (S10).

When the HDD 10 is removed from the main board 20 (S11), and an HDD 40 to which the serial number "SN1" is set is then connected, the CPU 24 determines that the serial numbers coincide with each other (S12). Specifically, the CPU 24 detects that the serial number "SN1" set in the information region of the HDD 40 and the serial number "SN1" memorized in the storage region of the HDD 40 coincide with each other but no apparatus information is stored in the storage region of the HDD 40. The CPU 24, thus, writes the apparatus information "FFF" held by the main board 20 into the storage region of the HDD 40 (S13).

First Management Example of Main Board

Figure 4:
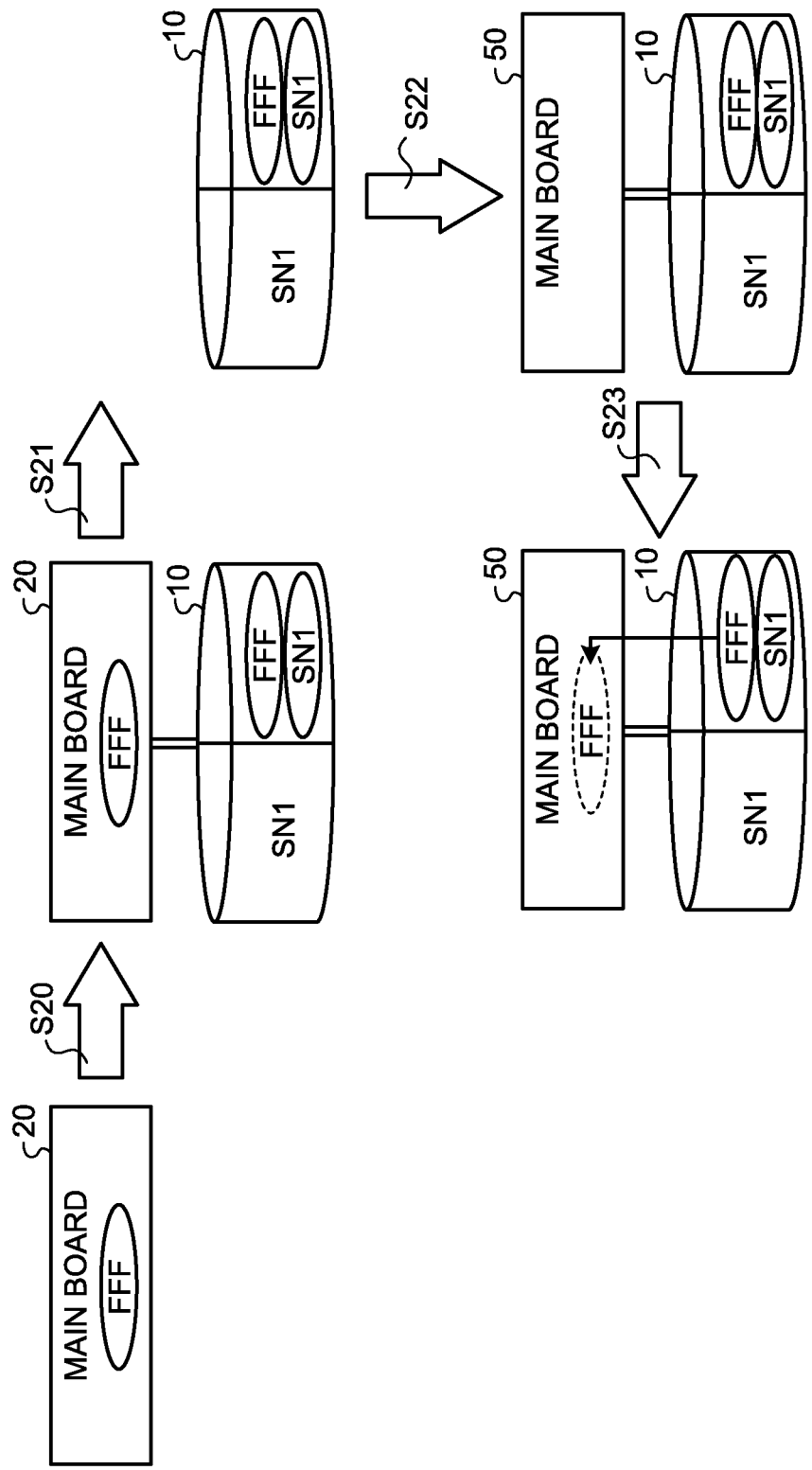
FIG. 4 is a diagram explaining a first management example when a main board is replaced.

FIG. 4 is a diagram explaining a first management example when the main board 20 is replaced. As illustrated in FIG. 4, when the HDD 10 to which the serial number "SN1" is set is connected while the main board 20 holds the apparatus information "FFF", the CPU 24 writes, into the storage region of the HDD 10, the apparatus information "FFF" held by the main board 20 and the serial number "SN1" (S20).

Thereafter, the main board 20 is replaced (S21). When a new main board 50 and the HDD 10 are connected, the CPU 24 determines that the serial numbers coincide with each other (S22). Specifically, the CPU 24 detects that the serial number "SN1" set in the information region of the HDD and the serial number "SN1" memorized in the storage region of the HDD 10 coincide with each other, but no apparatus information is stored in the storage region of the main board 50. The CPU 24, thus, writes the apparatus information "FFF" memorized in the storage region of the HDD 10 into the flash ROM of the main board 50 (S23).

Second Management Example of Main Board

Figure 5:
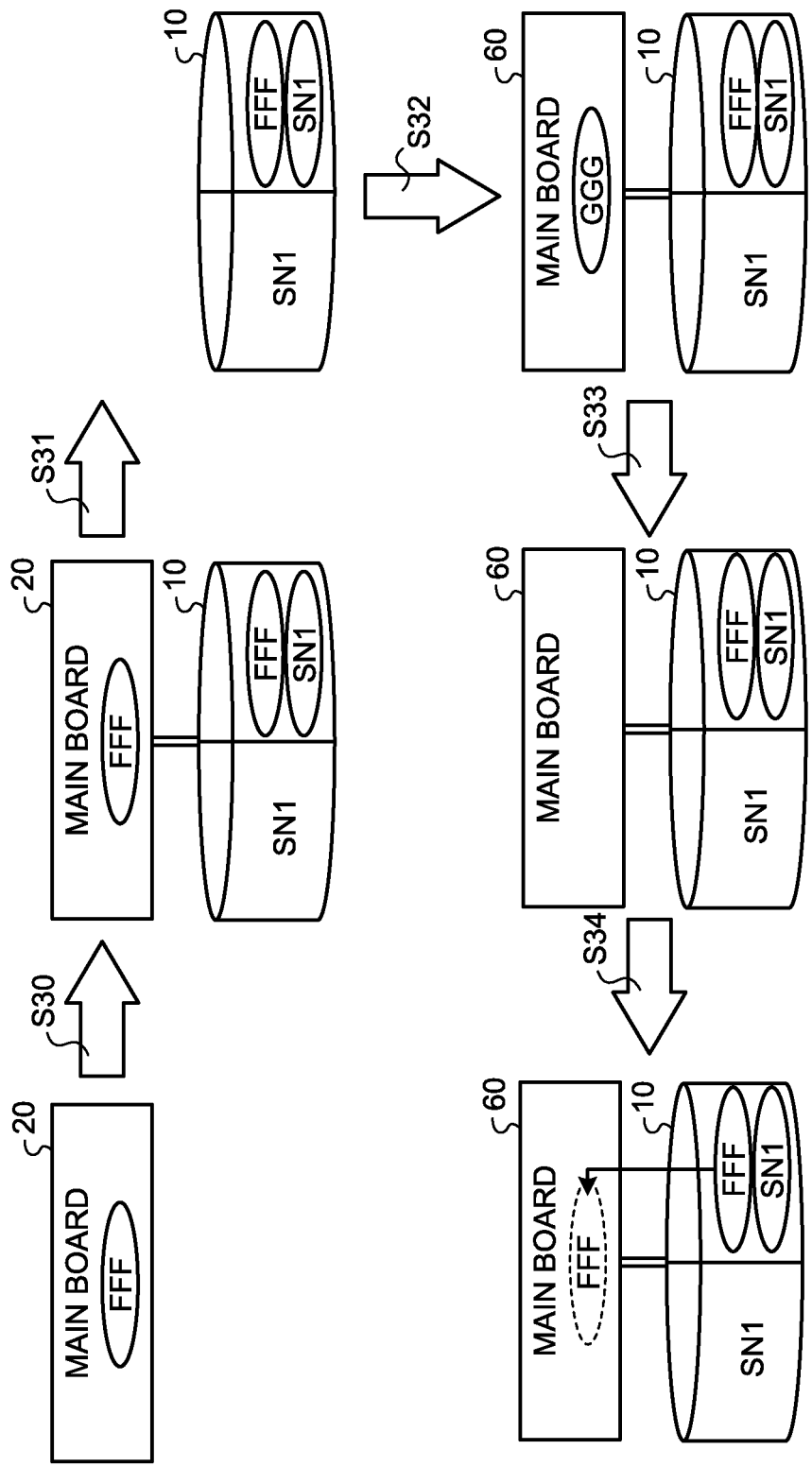
FIG. 5 is a diagram explaining a second management example when the main board is replaced.

FIG. 5 is a diagram explaining a second management example when the main board 20 is replaced. As illustrated in FIG. 5, when the HDD 10 to which the serial number "SN1" is set is connected while the main board 20 holds the apparatus information "FFF", the CPU 24 writes, into the storage region of the HDD 10, the apparatus information "FFF" held by the main board 20 and the serial number "SN1" (S30).

Thereafter, the main board 20 is replaced (S31). When a new main board 60 and the HDD 10 are connected, the CPU 24 determines that the serial numbers coincide with each other (S32). Specifically, the CPU 24 determines that the serial number "SN1" set in the information region of the HDD and the serial number "SN1" memorized in the storage region of the HDD 10 coincide with each other. The CPU 24 determines that the apparatus information "FFF" set in the information region of the HDD 10 and the apparatus information "GGG" memorized in the main board 60 do not coincide with each other.

The CPU 24 deletes the apparatus information "GGG" memorized in the main board 60 (S33) and writes the apparatus information "FFF" memorized in the storage region of the HDD 10 into the flash ROM of the main board 60 (S34).

Processing Flow

Figure 6:
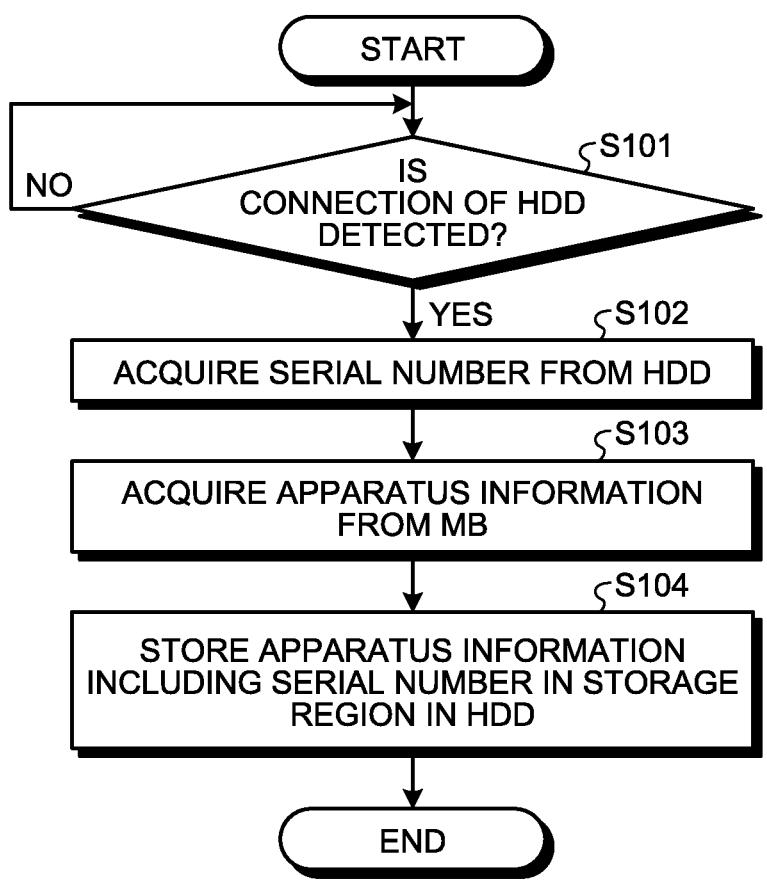
FIG. 6 is a flowchart illustrating a processing flow of processing at initial activation.

The following describes processing flows at the initial activation and at the management with reference to FIGS. 6 and 7.

Flow at Initial Activation

FIG. 6 is a flowchart illustrating a processing flow at the initial activation. As illustrated in FIG. 6, if it is determined that a detection is made that the HDD 10 is connected to the main board 20 (Yes at S101), the CPU 24 acquires the serial number from the information region 11 of the HDD 10 (S102).

The CPU 24 acquires the apparatus information from the main board (MB) 20 (S103). The CPU 24 stores the apparatus information including the serial number of the HDD 10 in the storage region 12 of the HDD 10 (S104).

Flow at Management

FIG. 7 is a flowchart illustrating a processing flow at the management. As illustrated in FIG. 7, if it is determined that a detection is made that the main board 20 or the HDD 10 is replaced or a new main board or a new HDD is connected (Yes at S201), the CPU 24 acquires the serial number from the information region of the connected HDD (S202). The CPU 24, then, acquires the serial number set to the HDD from the information region of the connected HDD (S203). In addition, the CPU 24 acquires the apparatus information from the flash ROM of the activated main board (MB) (S204).

If it is determined that the serial number memorized in the HDD and the serial number set to the HDD do not coincide with each other (No at S205), the CPU 24 stores, in the storage region of the HDD, the HDD serial number acquired at S203 in addition to the apparatus information acquired from the main board at S204 (S206).

If it is determined that the serial number memorized in the HDD and the serial number set to the HDD coincide with each other (Yes at S205), the CPU 24 determines whether the apparatus information memorized in the HDD and the apparatus information memorized in the main board coincide with each other (S207).

If it is determined that both apparatus information coincide with each other (Yes at S207), the CPU 24 ends the processing. If it is determined that both apparatus information do not coincide with each other (No at S207), and if it is determined that no apparatus information is memorized in the main board (Yes at S208), the CPU 24 stores the apparatus information memorized in the HDD in the flash ROM of the main board (S209).

If it is determined that both apparatus information do not coincide with each other (No at S207), and if it is determined that the apparatus information is memorized in the main board (No at S208), and if it is determined that no apparatus information is memorized in the HDD (Yes at S210), the CPU 24 stores, in the storage region of the HDD, the HDD serial number acquired at S203 in addition to the apparatus information acquired from the main board at S204 (S211). If it is determined that the apparatus information is memorized in the HDD (No at S210), the CPU 24 stores the apparatus information memorized in the HDD in the flash ROM of the main board (S212).

Effects

As described above, the information processing apparatus 1 stores, in the storage medium such as the HDD, the number that identifies the storage medium, such as the serial number of the storage medium, and compares the stored serial number of the storage medium with the serial number acquired from the storage medium, thereby making it possible to identify whether the storage medium is replaced. The information processing apparatus 1 can identify the replaced component and, thus, can manage correct apparatus information at maintenance operation such as component replacement.

When the flash ROM is wrongly rewritten in replacement of the main board, the information in the HDD and the information in the flash ROM differ from each other as described above. The information processing apparatus 1, thus, can rightly correct the information in the flash ROM on the basis of the information in the HDD. As a result, right apparatus information is consistently written into the flash ROM.

When the HDD is replaced, the information processing apparatus 1 writes the apparatus information in the flash ROM into the HDD. As described above, the apparatus information in the flash ROM is right information. The information processing apparatus, thus, can write right information into the HDD. The information processing apparatus 1 automatically corrects input error of the apparatus information in replacement of the main board, thereby making it possible to prevent the asset management program using the apparatus information from being adversely affected.

Second Embodiment

The first embodiment of the invention is described above. The invention may be implemented by various different embodiments other than the first embodiment. The following describes different embodiments.

Storage Device

In the first embodiment, the apparatus information memorized in the flash ROM 22 of the main board 20 is exemplarily described. The apparatus information is not limited to being memorized in the flash ROM 22. The apparatus information may be memorized in other storage devices. In the first embodiment, the apparatus information memorized in the main board 20 is saved in the HDD 10. Even when the apparatus information is saved in another storage device that is not included in the main board 20, the processing can be performed in the same manner as described in the first embodiment.

System

Out of the respective pieces of processing described in the first embodiment, all or a part of the pieces of processing described as being automatically performed can also be manually performed. All or a part of the pieces of processing described as being manually performed can also be automatically performed by known methods. The processing procedures, control procedures, specific names, information including various types of data, and parameters that are described and illustrated in the specification and the accompanying drawings can be arbitrary modified unless otherwise described.

The respective constituent elements of the respective devices illustrated in the accompanying drawings are functionally conceptual and need not be physically structured as illustrated. The specific forms of distribution and integration of the respective devices are not limited to those illustrated. The whole or a part of the respective devices can be structured by being functionally or physically distributed or integrated on the basis of any unit in accordance with the various loads and usage conditions. All or a part of the respective processing functions performed by the respective devices are achieved by the CPU and a program that is analyzed and executed by the CPU, or can be achieved as hardware by wired logic.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing apparatus comprising:
    a processor that:
        compares first identification information with second identification information, wherein the first identification information identifies a storage medium in which apparatus information about the information processing apparatus is saved, the apparatus information is memorized in a main board of the information processing apparatus, and the second identification information identifies a storage medium connected to the information processing apparatus;
        detects that a save destination of the apparatus information is replaced when the first identification information and the second identification information do not coincide with each other; and
        determines a state of the save destination of the apparatus information in accordance with a storage state of the apparatus information in the connected storage medium and a storage state of the apparatus information in the main board of the information processing apparatus when the first identification information and the second identification information coincide with each other.

2. The information processing apparatus according to claim 1, wherein
    the processor further, at the detecting, when determining that a storage medium different from the storage medium in which the apparatus information is saved is currently connected, stores in a storage region of the currently connected storage medium, the apparatus information memorized in the main board and the second identification information that identifies the currently connected storage medium.

3. The information processing apparatus according to claim 1, wherein the processor further, at the determining:
    when the apparatus information memorized in the connected storage medium and the apparatus information memorized in the main board do not coincide with each other, determines that writing of the apparatus information into the main board has failed and writes the apparatus information memorized in the storage medium into the main board;
    when the apparatus information is not memorized in the main board, determines that the main board is replaced and writes the apparatus information memorized in the storage medium into the main board; and
    when the apparatus information is not memorized in the storage medium, determines that the storage medium is replaced and writes the apparatus information memorized in the main board and the second identification information into the storage medium.

4. The information processing apparatus according to claim 1, wherein
    the processor further:
        acquires, from a storage medium connected at initial activation of the information processing apparatus, an identifier identifying the storage medium,
        stores the apparatus information and the identifier in a storage region of the storage medium, and
        at the comparing, when detecting that a new storage medium is connected after the storing in the storage medium, compares identification information set to a set region of the newly connected storage medium with identification information memorized in a storage region of the newly connected storage medium.

5. A non-transitory computer-readable recording medium storing a management program that causes a computer of an information processing apparatus to execute:
    comparing first identification information with second identification information, wherein the first identification information identifies a storage medium in which apparatus information about the information processing apparatus is saved, the apparatus information is memorized in a main board of the information processing apparatus, and the second identification information identifies a storage medium connected to the information processing apparatus;
    detecting that a save destination of the apparatus information is replaced when the first identification information and the second identification information do not coincide with each other; and
    determining a state of the save destination of the apparatus information in accordance with a storage state of the apparatus information in the connected storage medium and a storage state of the apparatus information in the main board of the information processing apparatus when the first identification information and the second identification information coincide with each other.

* * * * *